US011913555B2

(12) United States Patent
Quinn et al.

(10) Patent No.: US 11,913,555 B2
(45) Date of Patent: Feb. 27, 2024

(54) VALVE ASSEMBLIES AND RELATED METHODS FOR DEVIATED WELLS

(71) Applicant: Q2 Artificial Lift Services ULC, Red Deer (CA)

(72) Inventors: Jordy Quinn, Red Deer (CA); Reginald Leonard Prostebby, Red Deer (CA); Corbin Coyes, Red Deer (CA); Pawandeep Khaira, Red Deer (CA)

(73) Assignee: Q2 Artificial Lift Services ULC, Red Deer (CA)

( * ) Notice: Subject to any disclaimer, the term of this patent is extended or adjusted under 35 U.S.C. 154(b) by 0 days.

(21) Appl. No.: 17/811,445

(22) Filed: Jul. 8, 2022

(65) Prior Publication Data

US 2023/0011486 A1    Jan. 12, 2023

Related U.S. Application Data

(60) Provisional application No. 63/219,453, filed on Jul. 8, 2021.

(51) Int. Cl.
*F16K 15/04*   (2006.01)
*E21B 34/06*   (2006.01)

(52) U.S. Cl.
CPC ............ *F16K 15/048* (2013.01); *E21B 34/06* (2013.01); *E21B 2200/04* (2020.05); *F16K 15/042* (2013.01); *Y10T 137/7908* (2015.04)

(58) Field of Classification Search
CPC ...... F16K 15/048; F16K 15/042; E21B 34/06; E21B 2200/04; Y10T 137/7908
See application file for complete search history.

(56) References Cited

U.S. PATENT DOCUMENTS

| 2,535,320 | A | | 12/1950 | Richardson | |
| 2,590,244 | A | * | 3/1952 | Harbison | F16K 15/04 |
| | | | | | 137/515.7 |
| 3,661,167 | A | * | 5/1972 | Hussey | F16K 15/042 |
| | | | | | 137/533.15 |
| 4,340,084 | A | * | 7/1982 | Snow | F16K 15/044 |
| | | | | | 137/516.29 |
| 5,343,946 | A | * | 9/1994 | Morrill | E21B 33/1216 |
| | | | | | 166/325 |
| 6,029,685 | A | | 2/2000 | Carruth | |
| 7,069,997 | B2 | | 7/2006 | Coyes et al. | |
| 8,978,773 | B2 | * | 3/2015 | Tilley | E21B 34/142 |
| | | | | | 166/194 |
| 10,184,314 | B1 | * | 1/2019 | Bair | E21B 34/06 |
| 11,274,524 | B2 | | 3/2022 | Beeton | |
| 11,428,084 | B2 | | 8/2022 | Fraser et al. | |
| 11,549,334 | B2 | * | 1/2023 | Beeton | E21B 34/14 |

(Continued)

*Primary Examiner* — Daphne M Barry
*Assistant Examiner* — Frederick D Soski
(74) *Attorney, Agent, or Firm* — Smith Baluch LLP

(57) ABSTRACT

Valve assemblies for reciprocating downhole pumps are provided. The valve assembly may comprise: a flow cage comprising a housing and a tubular insert; an annular valve seat positioned below the tubular insert; and an elongated sealing member positioned above the annular valve seat and at least partially received into the tubular insert. In some embodiments, the elongated sealing member may be more stable and may more securely engage the valve seat compared to spherical valve balls. Related methods are also provided.

14 Claims, 13 Drawing Sheets

(56) References Cited

U.S. PATENT DOCUMENTS

| | | | |
|---|---|---|---|
| 2005/0257927 A1 | 11/2005 | Coyes et al. | |
| 2011/0232923 A1* | 9/2011 | Barbee | E21B 33/167 166/386 |
| 2011/0266472 A1* | 11/2011 | Russell | E21B 21/106 251/28 |
| 2014/0060837 A1* | 3/2014 | Love | E21B 34/142 166/325 |
| 2015/0159469 A1* | 6/2015 | Purkis | E21B 47/06 166/185 |
| 2015/0191988 A1 | 7/2015 | Kiesel et al. | |
| 2017/0089175 A1* | 3/2017 | Doane | E21B 23/006 |
| 2018/0179851 A1* | 6/2018 | Davies | E21B 23/01 |
| 2019/0032322 A1* | 1/2019 | Griebel | F16K 31/20 |
| 2019/0032446 A1* | 1/2019 | Gronning | E21B 34/06 |
| 2019/0120397 A1* | 4/2019 | Baer | E21B 21/10 |
| 2019/0353003 A1* | 11/2019 | Stachowiak, Jr. | E21B 34/08 |
| 2020/0011154 A1* | 1/2020 | Stachowiak, Jr. | E21B 34/142 |
| 2020/0165902 A1* | 5/2020 | Beeton | F16K 1/36 |
| 2021/0102448 A1 | 4/2021 | Fraser et al. | |
| 2021/0131423 A1* | 5/2021 | Valenzuela | F04B 47/06 |
| 2021/0140273 A1* | 5/2021 | Saponja | E21B 34/142 |
| 2021/0156225 A1* | 5/2021 | Arterbury | F04D 29/708 |
| 2021/0246992 A1* | 8/2021 | Ford | F16K 15/04 |
| 2021/0301621 A1* | 9/2021 | Pola | E21B 34/12 |
| 2021/0381338 A1 | 12/2021 | Coyes et al. | |
| 2022/0090470 A1* | 3/2022 | Pugliese | E21B 34/142 |
| 2022/0120158 A1 | 4/2022 | Coyes et al. | |
| 2022/0154554 A1 | 5/2022 | Beeton | |
| 2023/0011486 A1* | 1/2023 | Quinn | F16K 15/021 |
| 2023/0203913 A1* | 6/2023 | Stachowiak, Jr | F04B 47/02 137/533.11 |

* cited by examiner

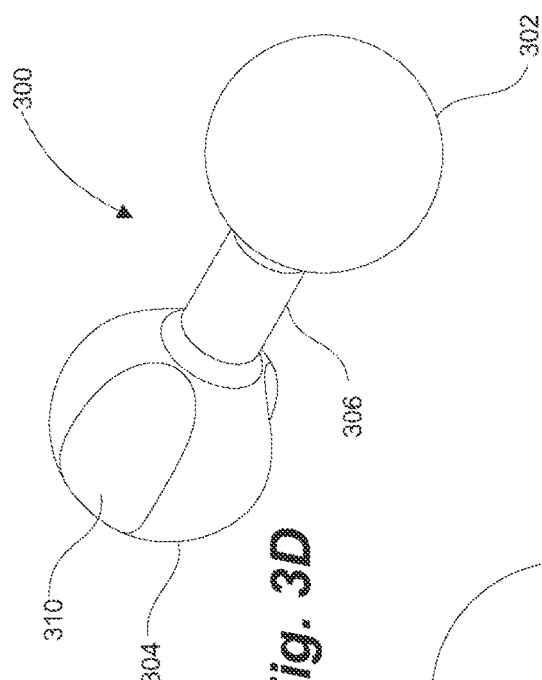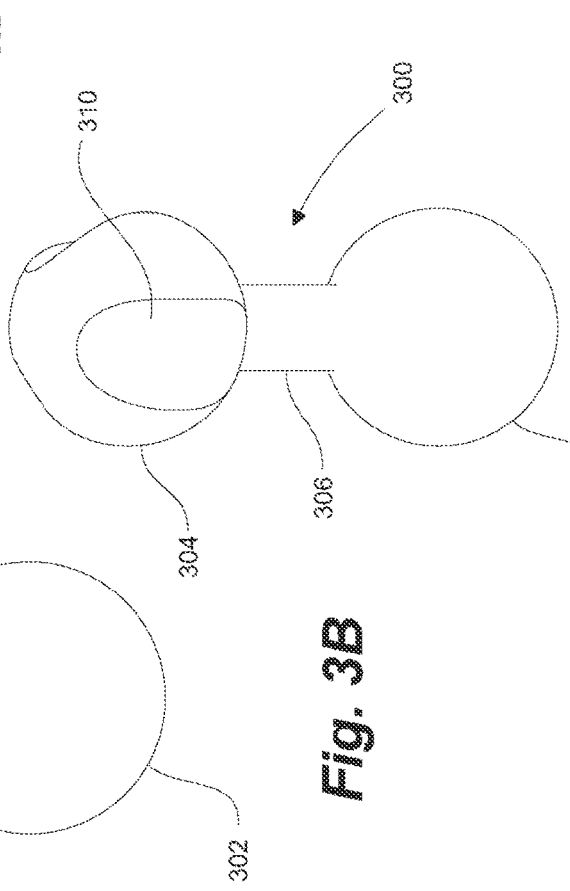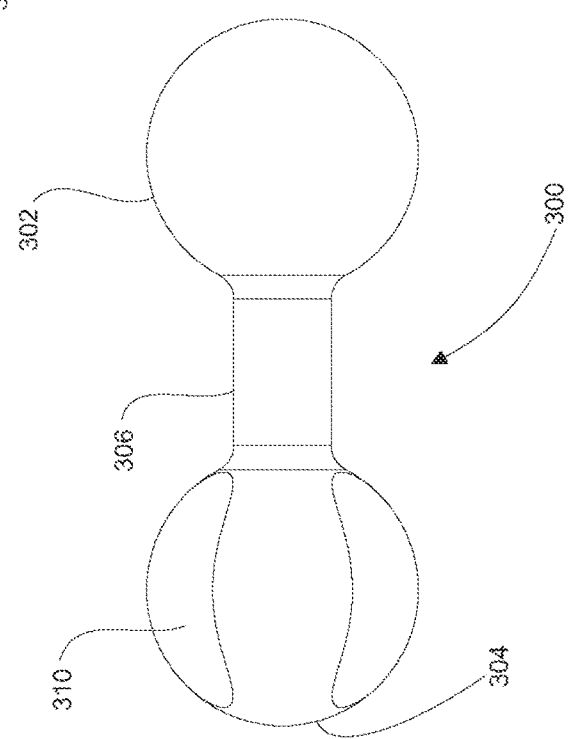

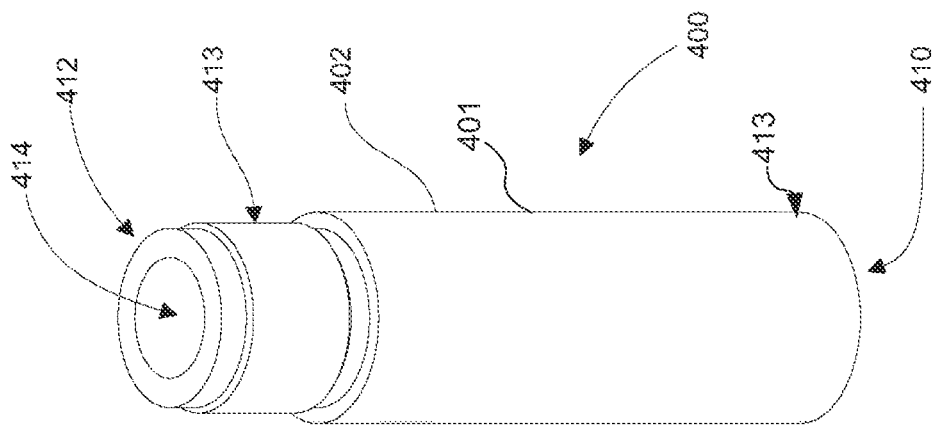
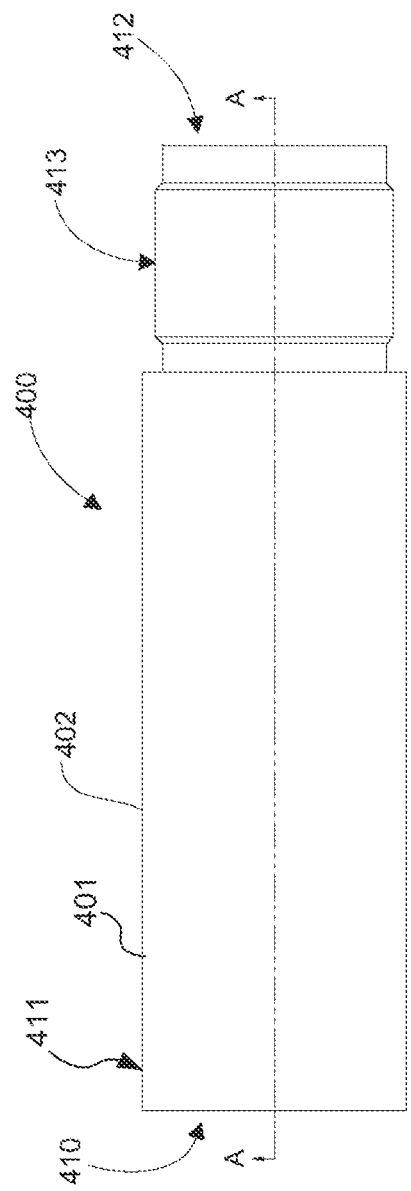
Fig. 4B
Fig. 4A

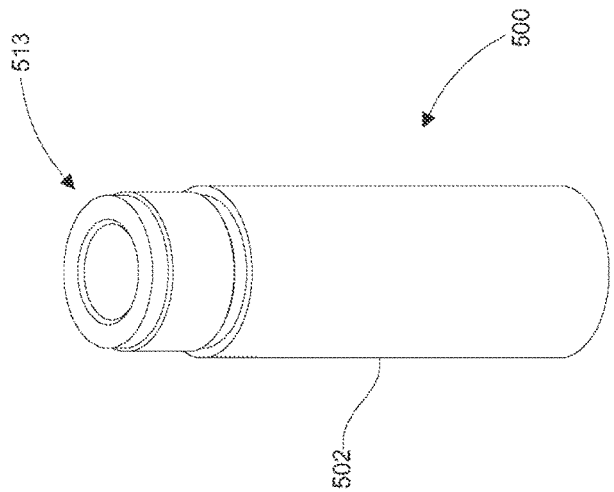
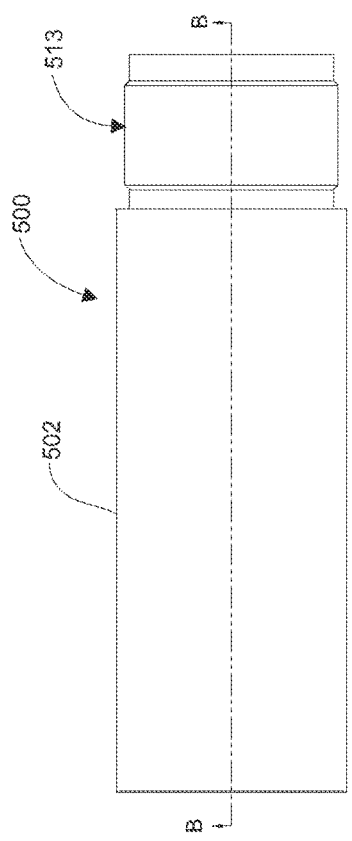
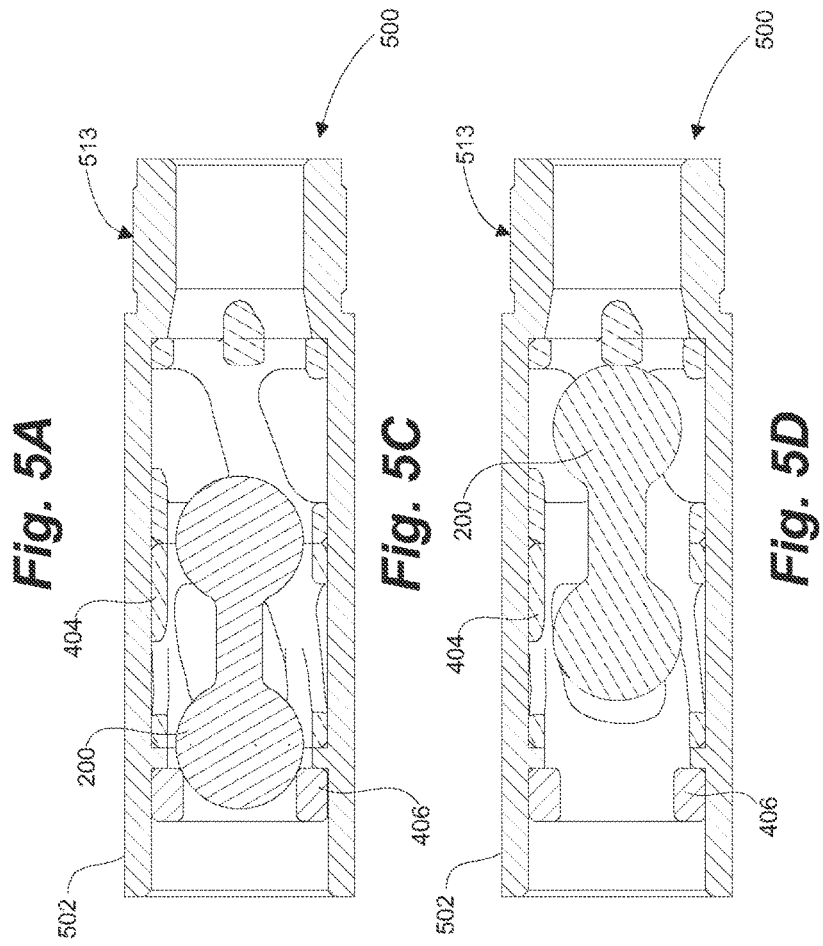

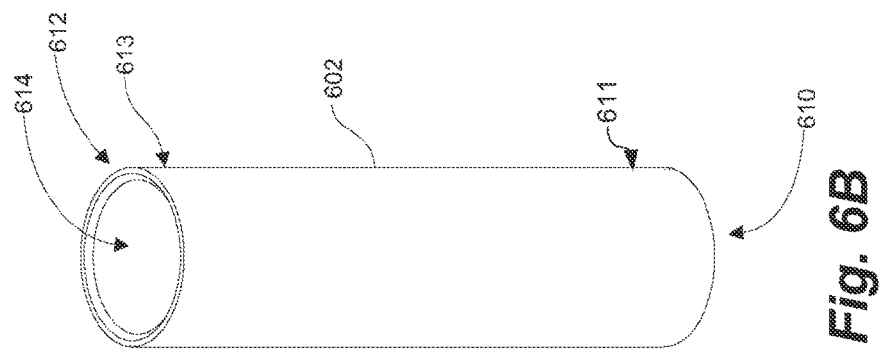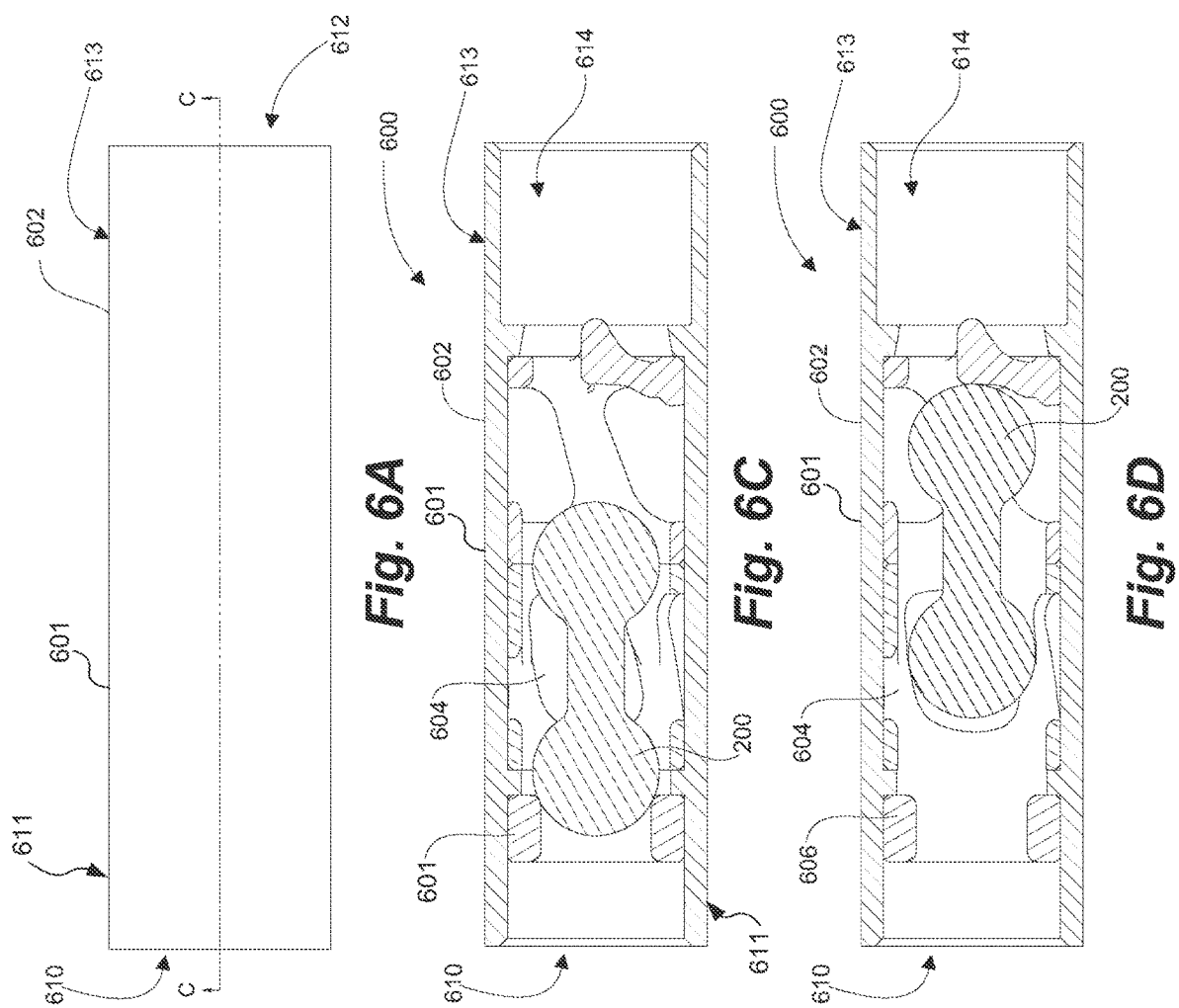

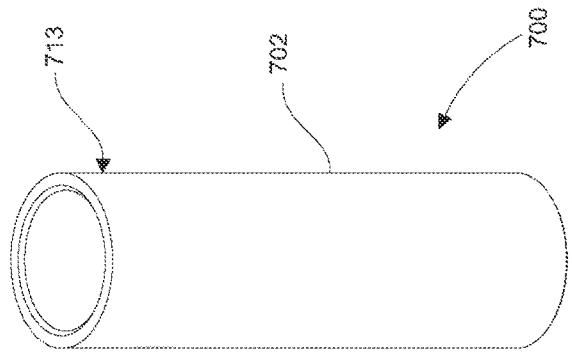
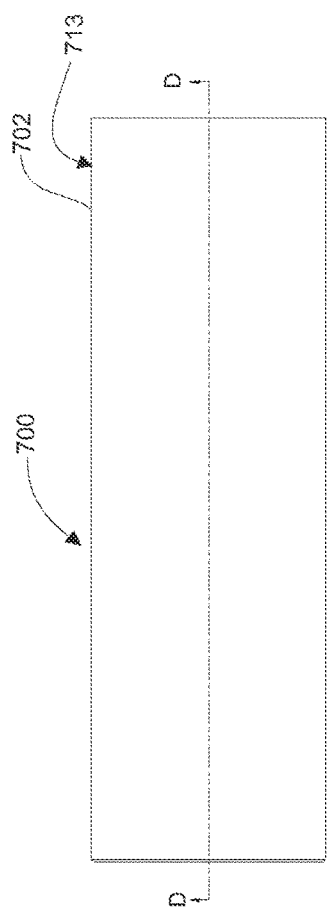
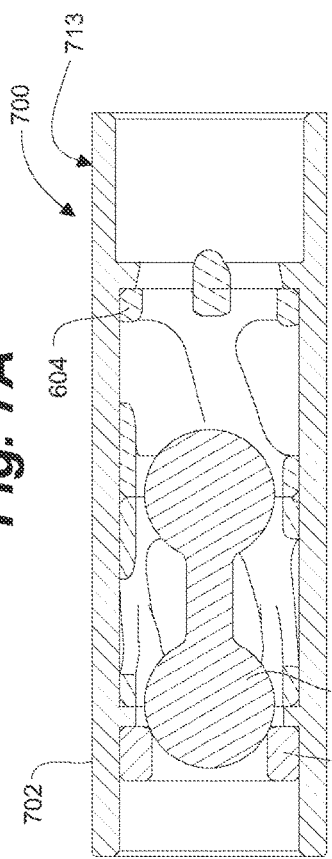
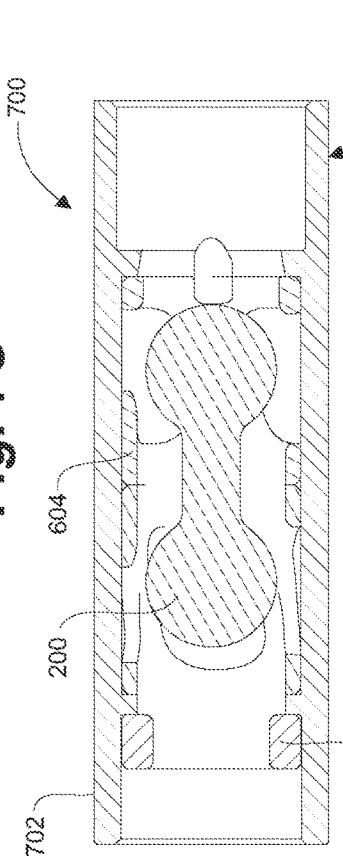
*Fig. 7B*
*Fig. 7A*
*Fig. 7C*
*Fig. 7D*

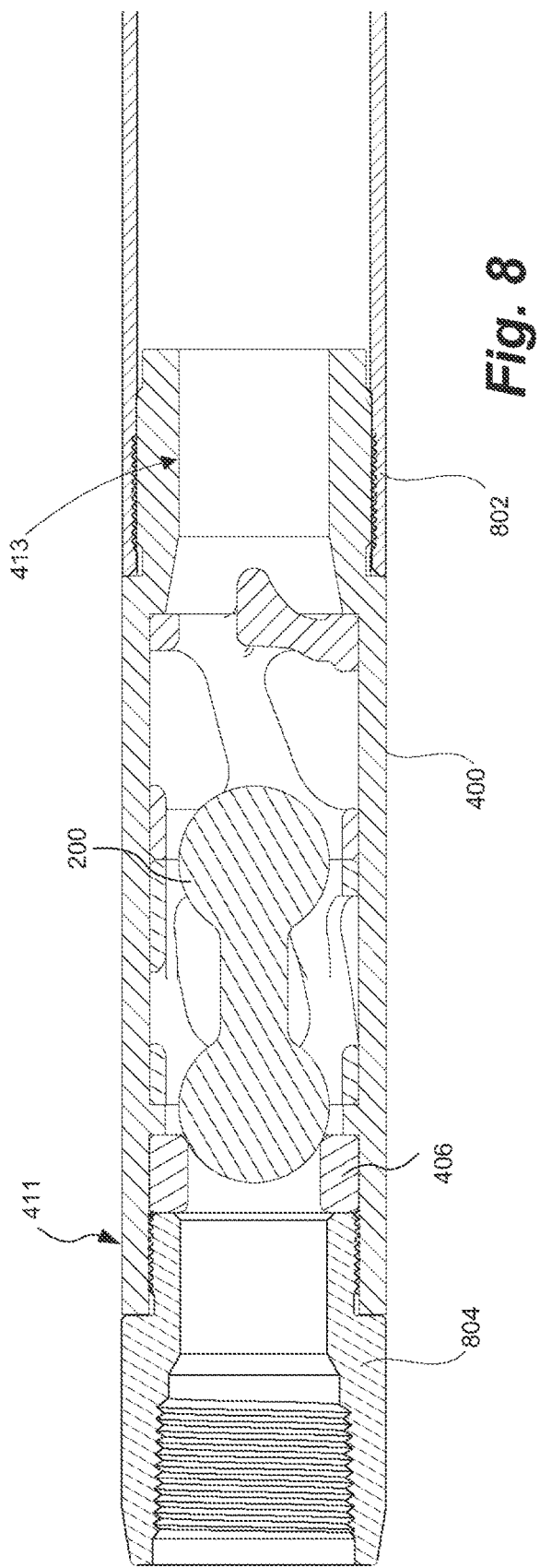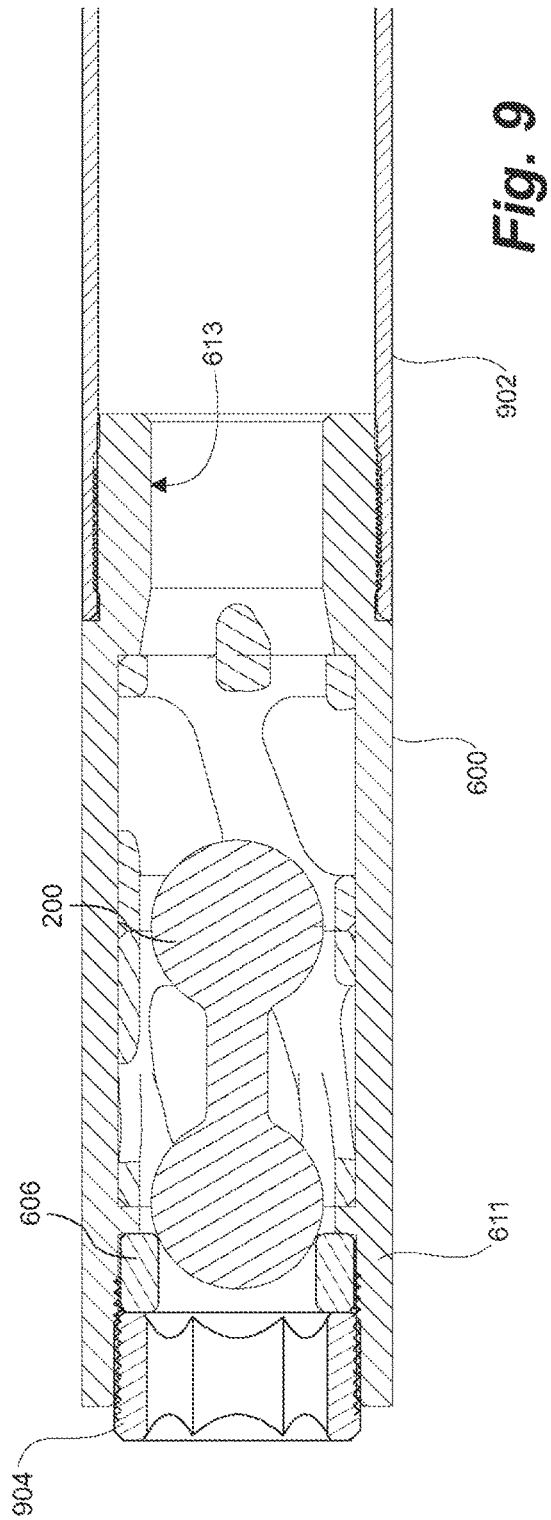

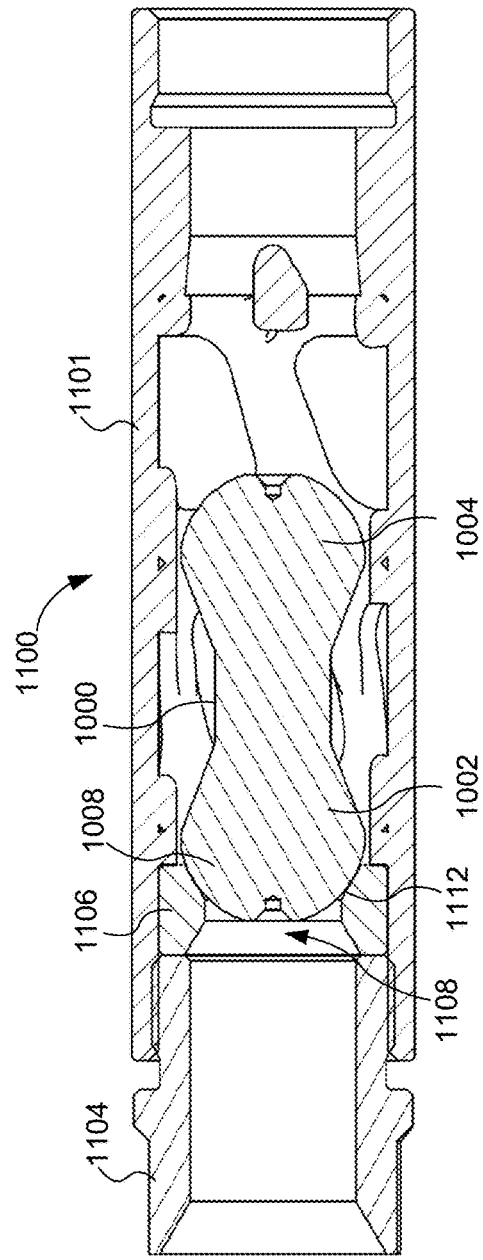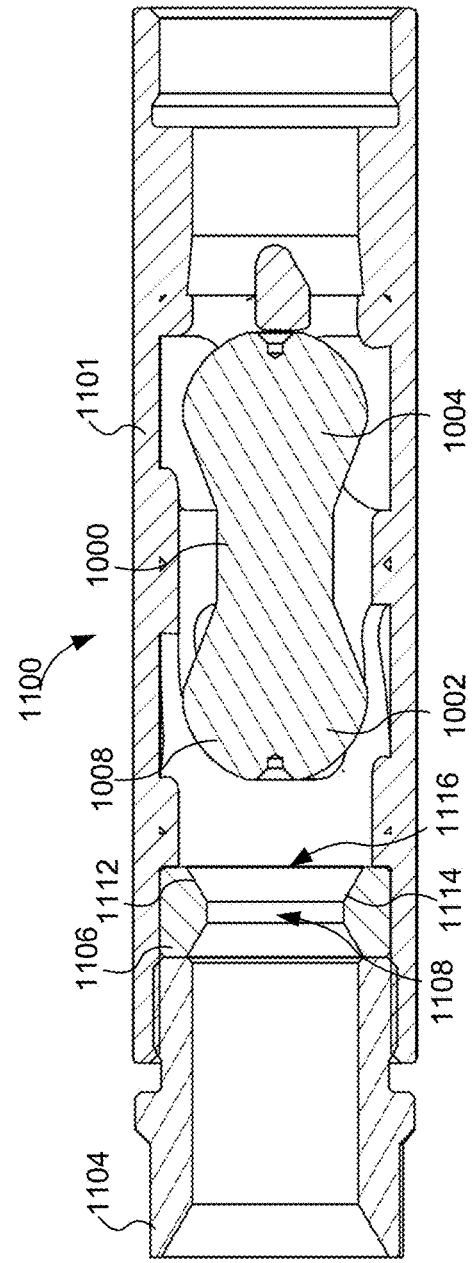
Fig. 11A
Fig. 11B

VALVE ASSEMBLIES AND RELATED METHODS FOR DEVIATED WELLS

RELATED APPLICATION

The present disclosure claims priority to U.S. Provisional Patent Application No. 63/219,453, filed Jul. 8, 2021, the entire content of which is herein incorporated by reference.

TECHNICAL FIELD

The present disclosure relates to artificial lift systems such as reciprocating downhole pumps. More particularly, the present disclosure relates to check valve assemblies and related methods for reciprocating downhole pumps in deviated wells.

BACKGROUND

In hydrocarbon recovery operations, an artificial lift system is typically used to recover fluids from a well in a subterranean earth formation. Common artificial lift systems include reciprocating pumps such as sucker rod pumps. The pump may generally comprise a plunger disposed within a barrel and a valve system. The plunger is moved up and down within the barrel in order to draw fluids to the surface. More particularly, the plunger may be coupled to a lower end of a reciprocating rod or rod string, for example. The rod string may be referred to as a "sucker rod."

The valve system may include a standing valve and a travelling valve. The standing valve may be positioned at the bottom of the barrel, and the travelling valve may be coupled to a bottom end of the plunger. On the downstroke, pressure differentials close the standing valve and open the travelling valve. Fluids in the barrel thereby pass upward through the travelling valve and plunger during the downstroke. On the upstroke, reversed pressure differentials close the travelling valve and open the standing valve. Fluids above the travelling valve are moved upward by motion of the plunger, and fluids from the earth formation or reservoir may enter the barrel (below the plunger) via the standing valve.

The standing valve and the travelling valve may each be a respective ball check valve. A typical ball check valve comprises a flow cage and a spherical valve ball held therein. The valve ball may move within the flow cage between a first position in which fluid flow through the cage is blocked and a second position in which fluid may flow through the cage.

FIG. 1 shows an example of a ball check valve assembly 100 configured for use as a standing valve. The valve assembly 100 comprises a flow cage 101, a valve seat 106, and a spherical valve ball 108. The flow cage 101 comprises a housing 102 defining an axial bore 114 therethrough and a flow cage insert 104 received within the axial bore 114. The insert 104 is similar to that described in U.S. Pat. No. 7,069,997, the entire content of which is herein incorporated by reference. The insert 104 defines side openings 116 distributed about its periphery. The insert 104 has an open bottom end 118 and a ball stop 120 at its top end 121. Top openings 122 are defined in the top end 121 of the insert 104 (in the ball stop 120) to allow fluid flow therethrough. The valve seat 106 is in the form of a ring positioned below the insert 104. The valve seat 106 defines central opening 124 therethrough. The valve ball 108 is movable within the insert 104 between a closed position, wherein the valve ball 108 is seated on the valve seat 106, and an open position, wherein the valve ball 108 is raised off of the valve seat 106. The valve ball 108 may be held against the ball stop 120 in the opened position.

When the valve ball 108 is in the open position, due to upward pressure on the valve ball 108, fluid may flow upward through the opening 124 in the ball seat, continue around the valve ball 108 (via side openings 116) and upward through the top openings 122. When the valve ball 108 is in the closed position and seated on the valve seat 106, the opening 124 is sealed (by downward pressure on the valve ball 108) and fluid is prevented from flowing downward through the valve assembly 100. The valve ball 108, thus, functions as a sealing member that blocks fluid flow in one direction through the flow cage 101 and allows fluid flow in the other (reverse) direction.

In a substantially vertical wellbore, gravity forces assist in keeping the valve ball 108 engaged with the valve seat 106. However, reciprocating pumps may also be deployed in deviated wells, including highly deviated wells. In highly deviated wells, ball check valves may fail to seal properly. Gravitational force may pull the valve ball downward and off the seat, allowing some fluid flow back into the formation, which causes a loss of production. The likelihood of this dislodging of the valve ball may increase as the angle of the deviated well section increases away from vertical.

SUMMARY

In one aspect, there is provided a valve assembly for a reciprocating downhole pump comprising: a flow cage comprising: a housing having a longitudinal axis and defining an axial bore therethrough; and a tubular insert received within the axial bore, the tubular insert defining an axial flow passage and a plurality of side openings to the axial flow passage; an annular valve seat received within the axial bore and positioned below the tubular insert; and an elongated sealing member positioned above the annular valve seat and at least partially received within the axial flow passage of the tubular insert, wherein the elongated sealing member is movable between a closed position, in which the elongated sealing member engages the valve seat to block fluid flow through the axial bore, and an open position, in which the elongated sealing member is displaced from the valve seat to allow fluid flow through the axial bore.

In some embodiments, the elongated sealing member comprises a first end portion that engages the valve seat and a stem portion extending from the first end portion.

In some embodiments, the first end portion is approximately spherical in shape.

In some embodiments, the first end portion has a hemi-spherical section that engages the valve seat and an annular flat section adjacent to the hemi-spherical section.

In some embodiments, the first end portion further comprises a recess in the hemi-spherical section, the recess approximately coaxial with the longitudinal axis.

In some embodiments, the first end portion is made of a different material than the stem portion.

In some embodiments, the elongated sealing member further comprises a second end portion, and wherein the stem portion interconnects the first end portion and the second end portion.

In some embodiments, the second end portion is substantially the same shape as the first end portion.

In some embodiments, the second end portion defines one or more grooves on an outer surface thereof.

In some embodiments, the second end portion comprises a circular disk defining a plurality of holes therethrough spaced around the perimeter of the circular disk, wherein the circular disk is in close tolerance with the tubular insert.

In some embodiments, the second end portion is made of a different material than at least one of the first end portion and the stem portion.

In some embodiments, each of the plurality of side openings is angled with respect to the longitudinal axis.

In some embodiments, the tubular insert comprises an upper insert section and a lower insert section, and wherein the plurality of side openings comprises an upper plurality of side openings defined by the upper insert section and a lower plurality of side openings defined by the lower insert section.

In some embodiments, each upper side opening of the upper plurality of side openings is helically aligned with a respective lower side opening of the lower plurality of side openings.

In some embodiments, the valve seat defines a frustoconical opening for the elongated sealing member.

In some embodiments, the valve assembly is a standing valve assembly or a travelling valve assembly.

In another aspect, there is provided a method for assembling a valve assembly, the method comprising: providing a flow cage, the flow cage comprising a housing and a tubular insert received within the housing; providing an elongated sealing member; inserting the elongated sealing member into the flow cage such that the elongated sealing member is at least partially received into the tubular insert; and installing a valve seat in the flow cage below the tubular insert.

In some embodiments, providing the flow cage further comprises providing a first insert section and a second insert section and assembling the first and second insert sections within the housing.

In another aspect, there is provided an elongated sealing member for a valve assembly, comprising: a first end portion comprising a hemi-spherical section, an angled section, and a flat annular section therebetween; and a stem portion extending from the first end portion.

In some embodiments, the elongated sealing member further comprises a second end portion, and wherein the stem portion interconnects the first end portion and the second end portion.

In some embodiments, the first end portion further comprises a recess in the hemi-spherical section, the recess approximately coaxial with a longitudinal axis of the elongated sealing member.

Other aspects and features of the present disclosure will become apparent, to those ordinarily skilled in the art, upon review of the following description of the specific embodiments of the disclosure.

BRIEF DESCRIPTION OF THE DRAWINGS

Some aspects of the disclosure will now be described in greater detail with reference to the accompanying drawings. In the drawings:

FIG. 3A is a side view of another example elongated sealing member, according to some embodiments;

FIG. 3B is an end view of the elongated sealing member of FIG. 3A;

FIGS. 3C and 3D are perspective views of the elongated sealing member of FIG. 3A;

FIG. 4A is a side view of an example standing valve assembly, including the elongated sealing member of FIGS. 2A-2C, according to some embodiments;

FIG. 4B is a perspective view of the standing valve assembly of FIG. 4A;

FIG. 5A is a side view of another example standing valve assembly including the elongated sealing member of FIGS. 2A-2C, according to some embodiments;

FIG. 5B is a perspective view of the standing valve assembly of FIG. 5A;

FIG. 5C is a cross-sectional view of the standing valve assembly of FIG. 5A taken along section line B-B, shown with the elongated sealing member in a closed position;

FIG. 5D is a cross-sectional view of the standing valve assembly of FIG. 5A taken along section line B-B, shown with the elongated sealing member in an open position;

FIG. 6A is a side view of an example travelling valve assembly including the elongated sealing member of FIGS. 2A-2C, according to some embodiments;

FIG. 6B is a perspective view of the travelling valve assembly of FIG. 6A;

FIG. 6C is a cross-sectional view of the travelling valve assembly of FIG. 6A, taken along section line C-C, shown with the elongated sealing member in a closed position;

FIG. 6D is a cross-sectional view of the travelling valve assembly of FIG. 6A taken along section line C-C, shown with the elongated sealing member in an open position;

FIG. 7A is a side view of another example travelling valve assembly including the elongated sealing member of FIGS. 2A-2C, according to some embodiments;

FIG. 7B is a perspective view of the travelling valve assembly of FIG. 7A;

FIG. 7C is a cross-sectional view of the travelling valve assembly of FIG. 7A taken along section line D-D, shown with the elongated sealing member in a closed position;

FIG. 7D is a cross-sectional view of the travelling valve assembly of FIG. 7A taken along section line D-D, shown with the elongated sealing member in an open position;

FIG. 8 is a side, cross-sectional view of the standing valve assembly of FIGS. 4A-4D, shown assembled with a barrel and a seat bushing;

FIG. 9 is a side, cross-sectional view of the travelling valve assembly of FIGS. 6A-6D, shown assembled with a plunger and a seat plug;

FIG. 11A is a side, cross-sectional view of a standing valve assembly including the elongated sealing member of FIGS. 10A-10C, shown with the elongated sealing member in a closed position;

FIG. 11B is a side, cross-sectional view of the standing valve assembly of FIG. 11A, shown with the elongated sealing member in an open position;

DETAILED DESCRIPTION

Figure 1:
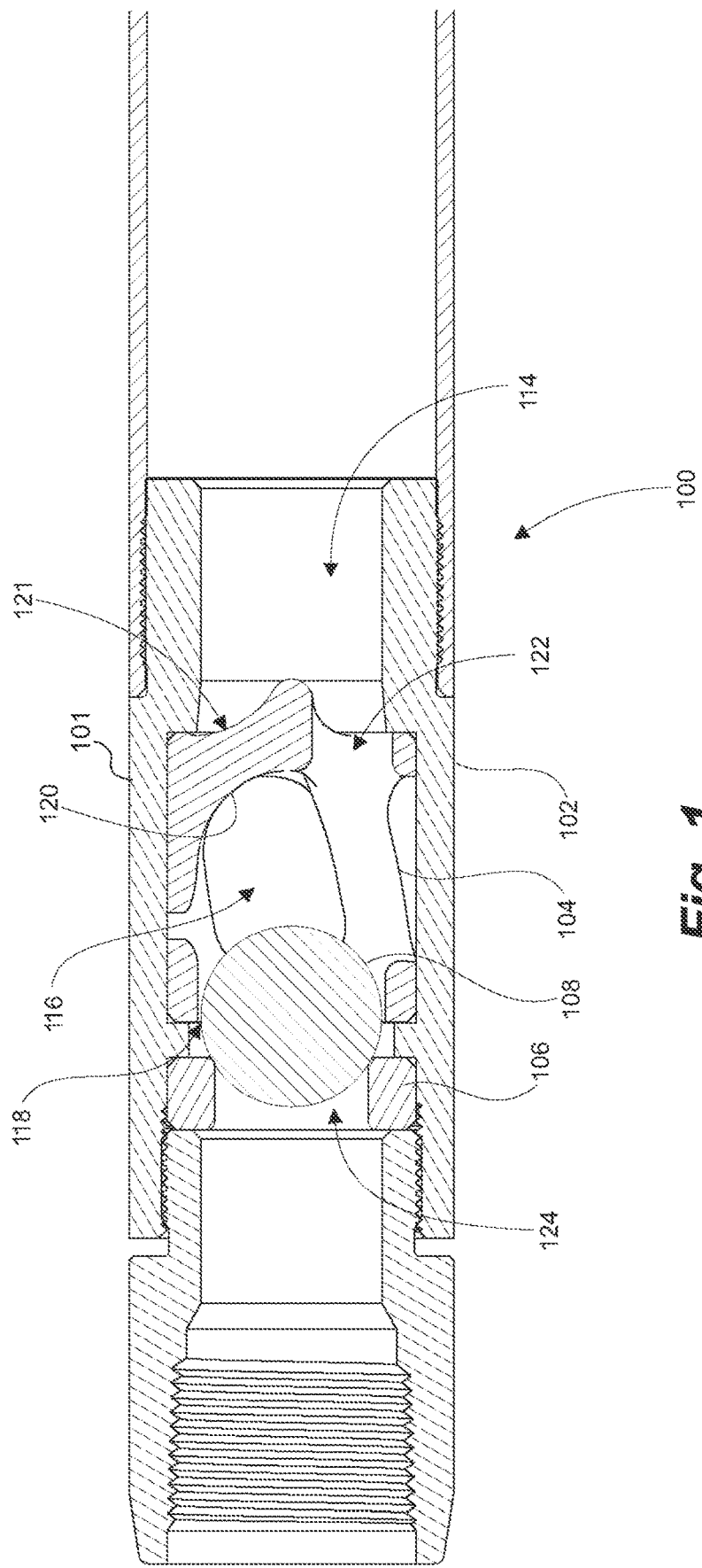
FIG. 1 is a side, cross-sectional view of a prior art standing valve assembly.

Generally, the present disclosure provides check valve assemblies for use in deviated wells, including highly deviated wells. According to an aspect, a check valve assembly may comprise a flow cage, a valve seat, and an elongated sealing member within the flow cage. The elongated sealing member is movable between a closed position sitting on a valve seat and an opened position raised off the valve seat. The elongated sealing member may, for example, be barbell shaped. Related methods for assembling valve assemblies are also provided.

As used herein the terms "a," "an," and "the" may include plural referents unless the context clearly dictates otherwise.

In this disclosure, the term "upward" may be used to refer to the "uphole" direction, where the "uphole" direction refers to the direction toward the surface in a well or borehole. The term "downward" may be used to refer to the "downhole" direction, where the "downhole" direction refers to the direction toward the bottom (or toe) of the well or borehole (i.e. opposite to the uphole direction). Use of any one or more of the foregoing terms does not necessarily denote positions along a vertical axis, since the wellbore may not be vertical.

The term "downhole pump" refers to any pumping system positioned within a well or borehole for pumping fluids or other materials to the surface. The term "reciprocating downhole pump" refers to any pump system in which one or more components reciprocates within the well for moving fluids or other materials uphole, such as downhole pump comprising a reciprocating plunger in a barrel.

The term "deviated well" refers to a well or bore having a section that is angled from vertical. A "highly deviated well" refers to a well or bore with a section that is at least 48 degrees from vertical. Highly deviated wells are inclusive of horizontal wells.

The term "horizontal well" refers to a well or bore that has a first section extending downward from the surface followed by a substantially horizontal section. The horizontal section may extend approximately parallel to the surface. It will be understood that the first and horizontal sections of the well may not be perfectly vertical or horizontal and deviations may occur along the length of the well.

The present disclosure provides check valve assemblies for reciprocating pumps that include an elongated sealing member, rather than a spherical valve ball. The check valve assembly may be a travelling valve assembly or a standing valve assembly in a reciprocating pump. In some embodiments, the elongated sealing member is barbell shaped. Other shapes are also possible. For example, the elongated sealing member may alternatively be generally capsule or peanut shaped.

In some embodiments, the elongated sealing member comprises a first end portion adapted to engage an annular valve seat in a closed position. A stem portion (e.g. a rod) may extend from the first end portion. The first end portion may be a lower end portion (as positioned in a flow cage) with the arm portion extending upward from the lower end portion. The cross-sectional area of the first end portion may be greater than the cross-sectional area of the stem portion. The lower end portion may have a circular cross section to fit in sealing engagement over a circular hole in the valve seat. The lower end portion may, for example, have a spherical or hemi-spherical shape. The elongated sealing member may further comprise a second, upper end portion connected to the stem portion, with the stem portion positioned intermediate the upper and lower end portions. The upper end portion may also have a circular cross section, such as a spherical or hem i-spherical shape. The stem portion may have a smaller outer diameter than the upper and/or lower end portions. The elongated sealing member may be more secure on the valve seat (when the valve is closed) and less likely to dislodge than spherical valve balls in deviated well sections.

Figures 2A, 2B, 2C:
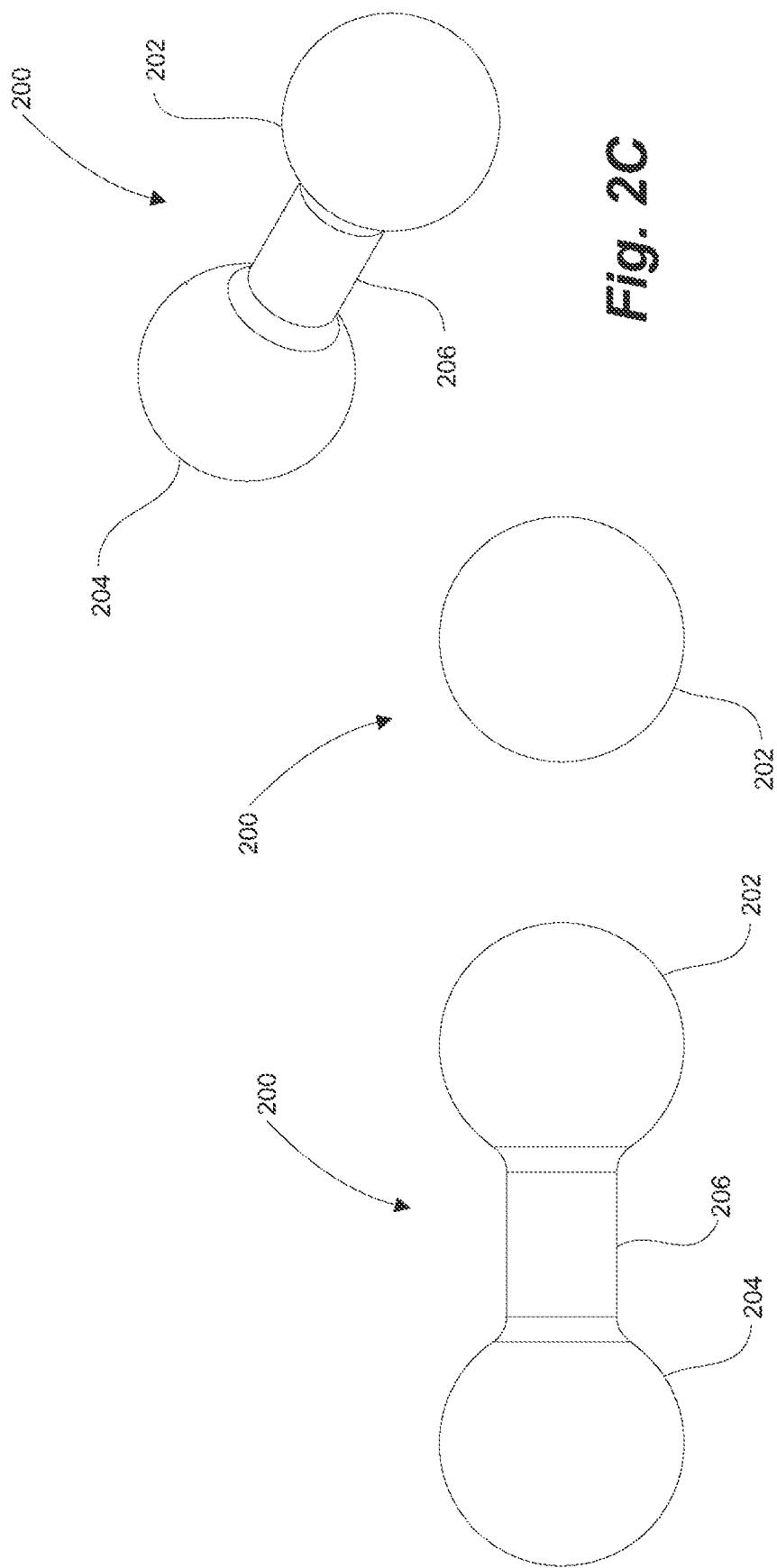
FIG. 2A is a side view of an example elongated sealing member, according to some embodiments.
FIG. 2B is an end view of the elongated sealing member of FIG. 2A.
FIG. 2C is a perspective view of the elongated sealing member of FIG. 2A.

FIGS. 2A to 2C show an example elongated sealing member 200 that may be used in a check valve assembly in some embodiments.

In this example, the elongated sealing member 200 is generally "barbell" shaped, comprising a first end portion 202, a second end portion 204, and a stem portion 206 interconnecting the first and second end portions 202 and 204. In this embodiment, the first and second end portions 202 and 204 are each approximately spherical. In some embodiments, the first end portion 202 and the second end portion 204 are substantially the same size and/or weight. In other embodiments, the first end portion 202 is a different size and/or weight than the second end portion 204.

The stem portion 206 may be in the form of an approximately cylindrical rod. The stem portion 206 may have an outer diameter and a cross-sectional area less than that of the first and second end portions 202 and 204.

The sealing member 200 is positionable within a flow cage of a valve assembly above a valve seat. The sealing member 200 has a closed position in which the sealing member 200 engages the valve seat and an open position in which the sealing member 200 is displaced from the valve seat. In this embodiment, the sealing member 200 is symmetrical such that either the first end portion 202 or the second portion 204 may be positioned adjacent the valve seat to sealingly engage the valve seat in the closed position. Hereafter, the end portion that engages the valve seat is also referred to as the "sealing end".

In some embodiments, the elongated sealing member 200 is solid. In other embodiments, the elongated sealing member 200 is at least partially hollow. The elongated sealing member 200 may comprise any suitable material, such as tungsten, tungsten carbide, metal (e.g. alloy steel), a composite material, or others. The suitability of materials may depend on the particular application and environment of the valve assembly including the sealing member 200.

In some embodiments, the first end portion 202, the second end portion 204, and the stem portion 206 are all made of the same material. In other embodiments, at least one of the first end portion 202, the second end portion 204, and the stem portion 206 is made of a different material. For example, the stem portion 206 may be made of an alloy steel while the first end portion 202 and/or the second end portion 204 may be made of a harder material (e.g. tungsten carbide), as the end portions 202, 204 are subjected to greater wear due to contact with the valve seat and flow cage. In some embodiments, the end portion 202 or 204 acting as the sealing end may be made of a harder material than the other end portion 202 or 204.

In some embodiments, the end portion 202 or 204 acting as the sealing end is subjected to a lapping procedure. The lapping procedure may involve grinding or any other suitable process.

FIGS. 3A to 3D show another example elongated sealing member 300 according to some embodiments. The sealing member 300 may be used in a valve assembly comprising a flow cage and a valve seat and may have a closed position and an open position as described above for the sealing member 200. The elongated sealing member 300 comprises spherical first and second end portions 302 and 304 interconnected by a stem portion 306, similar to the embodiment of FIGS. 2A to 2C. However, in this example, the second end portion 304 defines grooves 310 in its outer surface. The grooves 310 are axially aligned in this example (i.e., approximately parallel with a longitudinal axis of the elongated sealing member 300). However, in other embodiments, the grooves 310 may be angled with respect to the axial direction. For example, in some embodiments, the grooves 310 may be approximately helical (i.e., extending along a helical path).

In this embodiment, the first end portion 302 may function as the sealing end to sealingly engage the valve seat of the valve assembly when the sealing member 300 is in the closed position, and the second end portion 304 may be positioned above the first end portion. The grooves 310 may facilitate improved fluid flow through the valve assembly when the sealing member 300 is in a raised, open position. Improved flow may result in a lower overall pressure drop through the check valve.

Moreover, the one or more grooves 310 may also provide a visual distinction between the first end portion 302 and the second end portion 304, allowing a technician assembling the valve assembly to easily distinguish between the two end portions 302 and 304. This distinction may be particularly useful in embodiments in which only the first end portion 302 is subjected to a lapping procedure as it will reduce the risk of a technician erroneously performing the lapping procedure on the wrong end.

The sealing member 300 may be made of any of the materials described above for the sealing member 200. The first and second end portions 302 and 304 and the stem portion 306 may be made of the same or different materials.

Other variations of the sealing member 300 are also possible. As one example, in some embodiments, the second end portion 304 may be replaced with a circular perforated disk (not shown), which may assist with fluid flow through the valve assembly and help to stabilize the sealing member 300. The first end portion 302 and the circular perforated disk may be made of harder materials than the stem portion 306, which may be made of alloy steel, for example. The disk may comprise a plurality of holes extending therethrough (i.e. the perforations of the perforated disk) for fluid flow. The holes may be spaced around the perimeter of the disk. In some embodiments, the outer diameter of the disk is in close tolerance (i.e. has a close clearance fit) with a corresponding flow cage of a valve assembly. In other words, the outer diameter of the disk is slightly smaller than the inner diameter of the flow cage. For example, the outer diameter of the disk may be slightly smaller than the inner diameter of the tubular flow cage insert 404 of the valve assembly 400 as discussed below. The close tolerance between the disk and the flow cage allows the sealing member to move axially within the flow cage, while directing fluid flow through the plurality of holes in the disk rather than through the space between the disk and the flow cage.

In other embodiments, the second end portion 304 may be omitted and the sealing member 300 may comprise only one end portion and a stem portion extending therefrom.

FIGS. 4A to 4D show an example valve assembly 400 according to some embodiments. The valve assembly 400 is configured for use as a standing valve in a reciprocating pump (not shown). The valve assembly 400 comprises a flow cage 401, an annular valve seat 406, and the elongated sealing member 200 of FIGS. 2A to 2C (the valve seat 406 and elongated sealing member 200 are visible in FIGS. 4C and 4D).

Figure 4C:
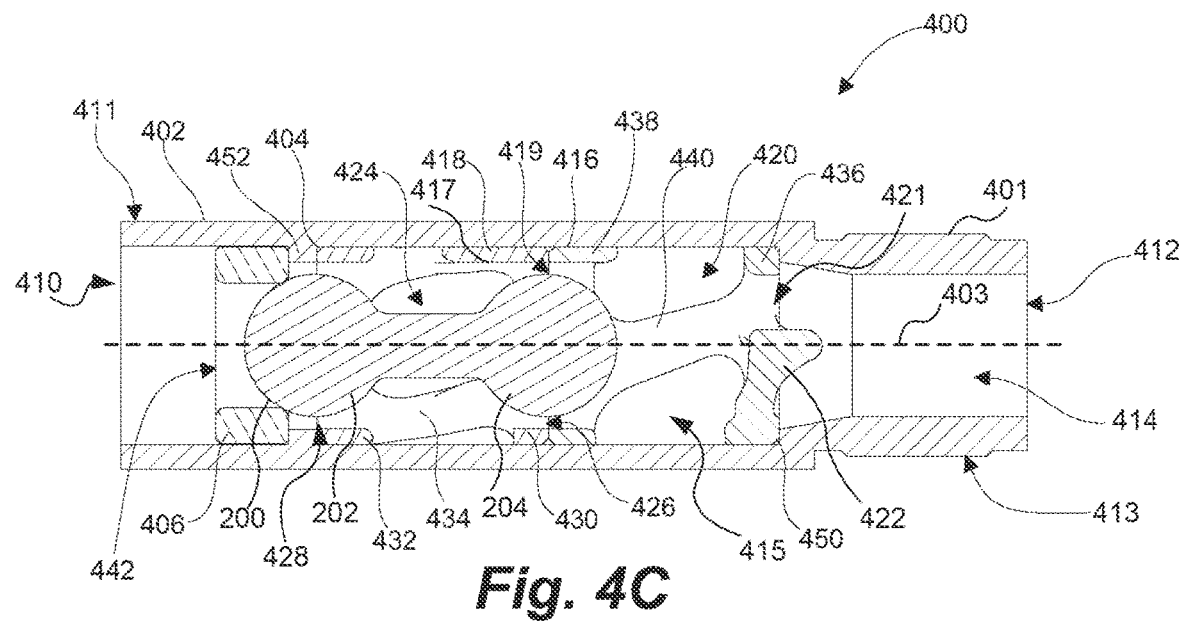
FIG. 4C is a cross-sectional view of the standing valve assembly taken along section line A-A in FIG. 4A, shown with the elongated sealing member in a closed position.
Figure 4D:
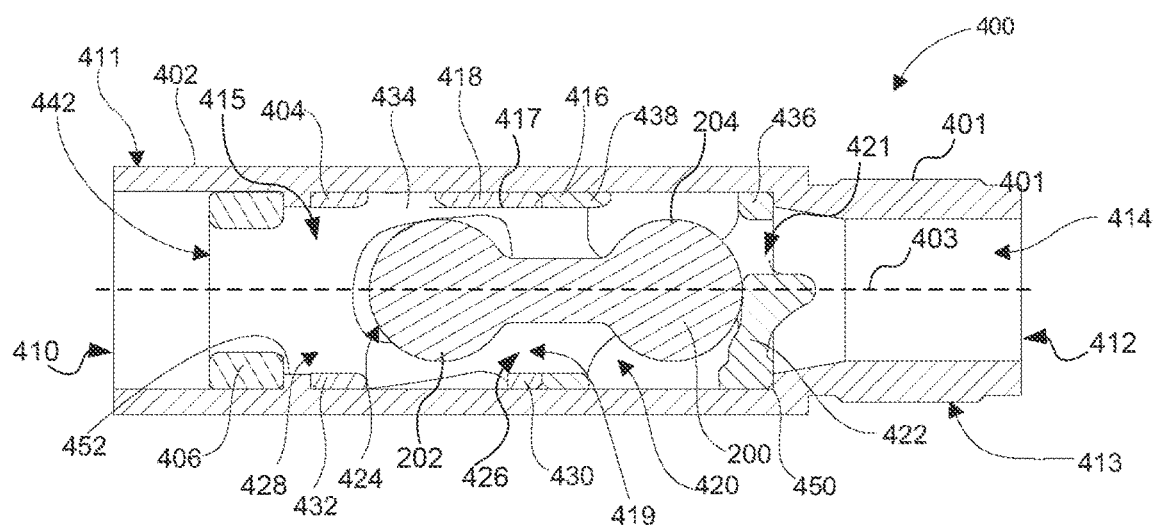
FIG. 4D is a cross-sectional view of the standing valve assembly taken along section line A-A in FIG. 4A, shown with the elongated sealing member in an open position.

Referring to FIGS. 4C and 4D, the flow cage 401 comprises a tubular housing 402 and a tubular flow cage insert 404. In this embodiment, the housing 402 and insert 404 are separate components; however, in other embodiments, they may be integral. The housing 402 and the insert 404 may be made of the same or different materials. For example, the housing 402 may be comprised of alloy steel, monel, or stainless steel, while the insert 404 may be comprised of cobalt or another hard, durable material.

The housing 402 has an inlet end 410 and an outlet end 412 and extends generally along a longitudinal axis 403. The housing 402 defines an axial bore 414 from the inlet end 410 to the outlet end 412. The housing 402 has a bottom connector portion 411 at the inlet end 410 and a top connector portion 413 at the outlet end 412. The bottom connector portion 411 may be configured to connect to seat bushing, for example. The bottom connector portion 411 may define internal threads (not shown) for connection to external threads of the seat bushing. The top connector portion 413 may be configured to connect to a barrel, for example. The top connector portion 413 may include external threads (not shown) to connect to internal threads of the barrel. See, for example, the barrel 802 and seat bushing 804 of FIG. 8, discussed in more detail below.

In this example, the housing 402 defines an inner annular shoulder 450 and an inner annular ridge 452 spaced axially from the inner annular shoulder 450 and projecting inwards into the axial bore 414. The tubular insert 404 is received within the axial bore 414 and positioned securely between the inner annular shoulder 450 and the inner annular ridge 452.

The tubular insert 404 has an inner wall 417 that defines an axial flow passage 415 extending therethrough. The flow passage 415 is dimensioned to receive the sealing member 200 therein. In some embodiments, the insert 404 comprises two or more insert sections. In this example, the insert 404 comprises a first (upper) insert section 416 and a second (lower) insert section 418 abutting one another and securely received in the axial bore 414. In other embodiments, the insert 404 may comprise one or more additional insert sections (not shown) to adjust the overall length of the insert 404.

The upper insert section 416 is generally tubular in shape and has a structure similar to the example insert 104 of FIG. 1. The upper insert section 416 comprises an upper ring 436 and a lower ring 438 with a plurality of side ribs 440 therebetween spaced around the circumference of the upper insert section 416. The upper and lower rings 436 and 438, and the ribs 440, collectively define a plurality of side openings 420 to the axial flow passage 415. In this embodiment, the upper insert section 416 comprises three side openings 420. In other embodiments, the upper insert section 416 may comprise any other suitable number of side openings 420.

The upper insert section 416 further comprises an upper stop 422 for the sealing member 200 (i.e., a "ball" stop). In this embodiment, the upper stop 422 comprises flanges extending inwardly from the upper ring 436. The side openings 420 extend through the upper stop 422 to form outlet openings 421. A lower (inlet) opening 419 is defined by the lower ring 438.

The lower insert section 418 is also generally tubular in shape. The lower insert section 418 comprises upper and lower rings 430 and 432 connected by a plurality of spaced side ribs 434, where the upper and lower rings 430 and 432 and side ribs 434 define a plurality of side openings 424. In this embodiment, the lower insert section 418 comprises three side openings 424. In other embodiments, the lower insert section 418 may comprise any other suitable number of side openings 424.

The upper ring 430 of the lower insert section 418 abuts the lower ring 438 of the upper cage section 416 and defines an upper opening 426 approximately aligned with the lower opening 419 of the upper cage section 416. The lower ring 432 defines a lower opening 428. The lower opening 428 may function as an inlet opening to the flow passage 415 of the insert 404. Fluid may thereby flow uphole through the flow passage 415 via the lower opening 428 and exit the insert 404 via the outlet openings 421.

The ribs 434 and 440 of the upper and lower insert sections 416 and 418, respectively, are elongated and angled with respect to the longitudinal axis 403 of the housing 402. The upper and lower side openings 420 and 424 are therefore also elongated and angled. In this embodiment, the ribs 434 and 440 and the side openings 420 and 424 are helical (i.e., extending along a helical path). The angled shape of the side openings 420 and 424 may impart a vortex flow or centrifugal effect to the fluid passing through the flow passage 215 and around the first and second end portions 202 and 204 of the barbell-shaped elongated sealing member 200. This may facilitate an equal fluid profile acting along the whole length of the sealing member 200, which may in turn reduce or eliminate major pressure drops and/or rattling or chattering of the sealing member 200 in the flow cage 401.

As shown in FIGS. 4C and 4D, the upper cage section 416 and the lower insert section 418 are oriented such that the ribs 434 and 440 are approximately aligned. The ribs 434 and 440 in this embodiment are helically aligned (i.e., extending along the same helical path) around the circumference of the insert 404. When the ribs 434 and 440 are aligned, the side openings 420 and 424 are also approximately aligned. In other words, each upper side opening 420 is aligned with a respective lower side opening. The side openings 420 and 424 are helically aligned in this embodiment (i.e., extending along the same helical path). This arrangement may further reduce pressure drops and/or vibrations of the elongated sealing member 200.

In other embodiments, the ribs (and thus the side openings) may extend substantially parallel to the longitudinal axis, rather than at an angle. Other variations are also possible and the side openings 420 and 424 may have any other suitable shape, size, spacing or orientation.

In an alternative embodiment, a unitary flow cage insert (not shown) may be used, rather than two or more abutting insert sections. In these embodiments, the unitary flow cage may comprise an upper ring (with an upper stop portion extending therefrom), a lower ring, and a plurality of side ribs extending therebetween defining a plurality of side openings. The side ribs and the side openings may be axially longer than the ribs 434 and 440 and the side openings 420 and 424. In some embodiments, a circumferential rim may extend around the longer ribs at an intermediate position between the upper ring and the lower ring, at a similar position to the abutted rings 430 and 438 of the insert 404. The circumferential rim may help to stiffen and support the unitary insert. In other embodiments, the circumferential rim may be omitted.

In yet other embodiments, rather than one or more inserts received within the housing, the housing and insert may be formed as a unitary piece (e.g., by a molding or machining process).

The valve seat 406 is configured to engage the sealing member 200. The valve seat 406 may be made of a hard, durable material such as cobalt, or any other suitable material. The valve seat 406 is annular in shape (i.e., ring-shaped) with a central, circular channel 442. The annular valve seat 406 is received within the axial bore 414 of the housing 402 and secured in a position below the insert 404. In this embodiment, the valve seat 406 is positioned below and abutting the inner annular ridge 452.

The elongated sealing member 200 is received within the flow cage 101 above the valve seat 406 and is at least partially received within the insert 404. The elongated sealing member 200 is axially movable between a closed position (shown in FIG. 4C), in which the elongated sealing member 200 is seated on the valve seat 406, and an open position (shown in FIG. 4D), in which the elongated sealing member 200 is displaced (i.e., raised) from the valve seat 406.

In operation, upward pressure on the elongated sealing member 200 (due to a pressure differential during the upstroke of the pump cycle) may push the elongated sealing member 200 off the valve seat 406 and to the open position, such that fluid may flow upward through the valve assembly (i.e., through the axial bore 414). Upward fluid flow may hold the elongated sealing member 200 against the upper stop 422 in the opened position. Downward pressure (due to a reverse pressure differential during the downstroke of the pump cycle) may hold the sealing member 200 in engagement with the valve seat 406 such that fluid is prevented from flowing downward through the valve assembly 400.

When the valve assembly 400 is disposed in a deviated well section, the elongated sealing member 200 may be more stable and secure in the closed position, and less prone to leaking, than a simple spherical valve ball. At deviated angles of the wellbore, the second end portion 204 of the sealing member 200 may shift the center of gravity of the elongated sealing member 200 above the first end portion 202 that forms a seal when engaged with the valve seat 406. The center of gravity may be at a point along the stem portion 206. At deviated angles, gravitational forces may cause the sealing member 200 to rotate such that the upper, second end portion 204 moves gravitationally downward in relation to the lower, first end portion 202. The upper, second end portion 204 may come into contact with the inner wall 417 of the insert 404. The force of the inner wall 417 of the insert 404 against the sealing element 200 may prevent further rotation of the sealing member 200. As a result, the lower, first end portion 202 experiences relatively less movement (against the valve seat 406) than the upper, second end portion 204. Less rotation of the first end portion 202 on the valve seat 406 may reduce the likelihood of the sealing member 200 coming off the valve seat 406 and breaking the seal. With the second end portion 204 in contact with the inner wall 417 of the insert 404 and further rotation of the sealing member 200 stopped, axial sliding movement of the sealing member 200 would be required to disengage the sealing member 200 from the valve seat 406 to break the seal. As gravity may not act in this axial direction, the elongated sealing member 200 may maintain a sufficient seal while in the closed position in the deviated well section.

Therefore, embodiments of the valve assembly 400 with the sealing member 200 may maintain proper function deviated wells, including highly deviated wells such as horizontal wells.

Moreover, valve assemblies including the sealing member 200 may have a longer functional life than valve assemblies with conventional spherical valve balls. Since the second end portion 204 may be in contact with the inner surface 417 of the insert 404, the second end portion 204 may tend to experience wear or damage more than the first end portion 202. The second end portion 204 may therefore function as a sacrificial wear element to reduce the wear on the first end portion 202. Since the first end portion 202 acts as the sealing component of the valve assembly 400, reducing wear of the first end portion 202 may extend the functional life of the valve assembly 400. This allows the valve assembly 400 to be used for more open and close cycles, contributing to increased production.

FIGS. 5A to 5D show another example standing valve assembly 500 according to some embodiments. The standing valve assembly 500 in FIGS. 5A to 5D is similar in structure and function to the example shown in FIGS. 4A to 4D, and like reference numbers indicate like elements. Compared to the example of FIGS. 4A to 4D, the top connector portion 513 in this embodiment has a shorter length relative to the housing 502. The size of the valve assembly 500 and its components may vary.

FIGS. 6A to 6D show an example travelling valve assembly 600 according to some embodiments. Similar to the standing valve assemblies 400, 500 described above with reference to FIGS. 4A to 5D, the travelling valve assembly 600 comprises a flow cage 601, a valve seat 606, and an elongated sealing member 200.

The flow cage 601 comprises a tubular housing 602 and a tubular flow cage insert 604. The tubular housing 602 has an inlet end 610 and an outlet end 612 and defines an axial bore 614 from the inlet end 610 to the outlet end 612. The housing 602 has a bottom connector portion 611 at the inlet end 610 and a top connector portion 613 at the outlet end 612. The bottom connector portion 611 may be configured to connect to a seat plug. The bottom connector portion 611 may define internal threads (not shown) for connection to external threads of the seat plug. The top connector portion 613 may be configured to connect to a plunger. The top connector portion 613 may include external threads (not shown), for example, to connect to internal threads of a bottom end of the plunger. See, for example, the seat plug 904 and plunger 902 of FIG. 9. In this example, the top connector portion 613 of the housing 602 may have a female thread, although embodiments are not limited to this configuration.

The insert 604 is received within the axial bore 614 of the housing 602. The insert 604 may be similar in structure to the insert 404 of the valve assembly 400, as discussed above.

The elongated sealing member 200 of FIGS. 2A to 2C is received within the insert 604 and the housing 602, above the valve seat 606. The elongated sealing member 200 is movable between a closed position, wherein the elongated sealing member 200 is seated on the valve seat 606, and an open position, wherein the elongated sealing member 200 is displaced from (i.e., raised off of) the valve seat 606.

In operation, upward pressure on the elongated sealing member 200 (due to a pressure differential during the downstroke of the pump cycle) may push the elongated sealing member 200 off the valve seat 606 and to the open position, such that fluid may flow upward through the valve assembly 600 (i.e., through axial bore 614). Downward pressure (due to a reverse pressure differential during the upstroke of the pump cycle) may hold the sealing member 200 in engagement with the valve seat 606 such that fluid is prevented from flowing downward through the valve assembly 600. When the travelling valve assembly 600 is disposed in a deviated well section, the barbell-shaped sealing member 200 may be more stable and secure in the closed position, as discussed above with respect to the standing valve assembly 400.

FIGS. 7A to 7D show another example travelling valve assembly 700 according to some embodiments. The travelling valve assembly 700 in FIGS. 7A to 7D is similar in structure and function to the example shown in FIGS. 6A to 6D, and like reference numbers indicate like elements. Compared to the example of FIGS. 6A to 6D, the top connector portion 713 in this embodiment has a shorter length relative to the housing 702. In this example, the top connector portion 713 may have a female thread (not shown), although embodiments are not limited to this configuration.

FIG. 8 is a side cross-sectional view of the standing valve assembly 400 of FIG. 4 connected to a barrel 802 at its uphole end and a seat bushing 804 at its downhole end. The barrel 802 is connected to the top connector portion 413 of the housing 402 and the seat bushing 804 is connected to the bottom connector portion 411 of the housing 402. The seat bushing 804 may secure the valve seat 406 in position.

FIG. 9 is a side cross-sectional view of the travelling valve assembly 600 of FIG. 6 connected to a plunger 902 at its uphole end and a seat plug 904 at its downhole end. The plunger 902 is connected to the top connector portion 613 of the housing 602 and the seat plug 904 is connected to the bottom connector portion 611 of the housing 602 and may secure the valve seat 606 in position.

Figure 10A:
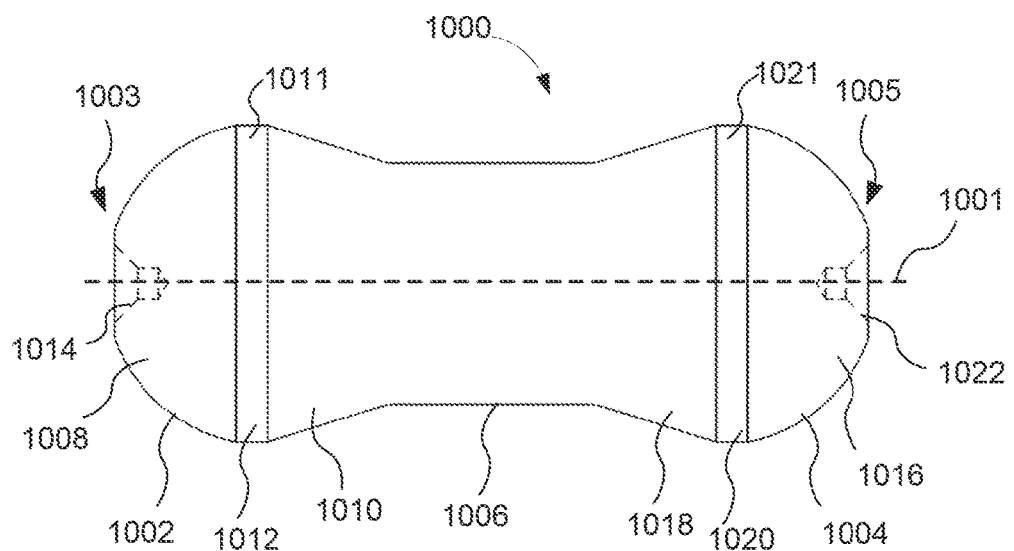
FIGS. 10A, 10B, and 10C are side, end, and perspective views, respectively, of another example elongated sealing member, according to some embodiments.
Figure 10B:
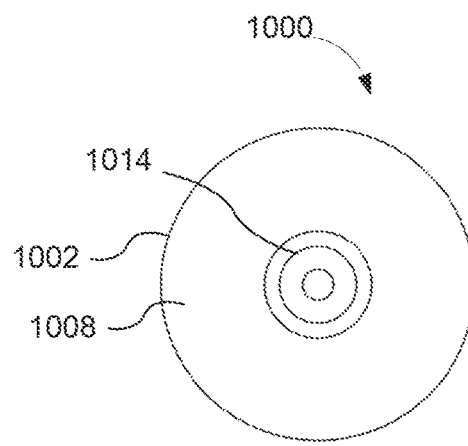
Figure 10C:
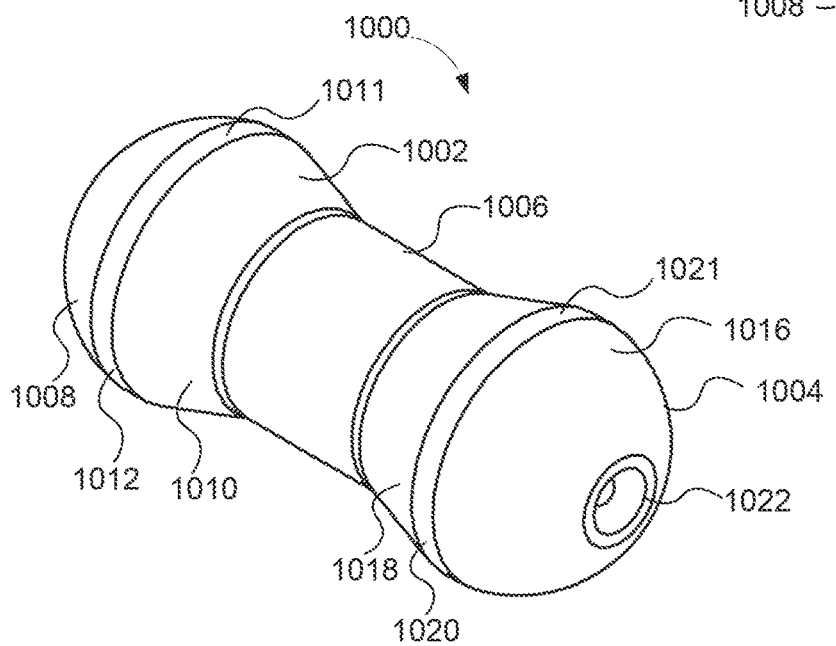

FIGS. 10A to 10C show another example elongated sealing member 1000, according to some embodiments. The sealing member 1000 may be used in a valve assembly comprising a flow cage and a valve seat.

Referring to FIG. 10A, the sealing member 1000 has a first end 1003 and a second end 1005 and extends along a longitudinal axis 1001. The longitudinal axis 1001 may approximately align with the longitudinal axis of a flow cage when the sealing member 1000 is deployed in a valve assembly. The sealing member 1000 is generally "barbell" shaped and comprises a first end portion 1002, a second end portion 1004, and a stem portion 1006 therebetween.

The first end portion 1002 comprises a hemi-spherical section 1008, an angled section 1010, and an annular flat section 1012 therebetween. The hemi-spherical section 1008 is at the first end 1003 of the sealing member 1000 and the angled section 1010 connects the first end portion 1002 to the stem portion 1006. The annular flat section 1012 is adjacent to the hemi-spherical section 1008 and extends around the circumference of the first end portion 1002. The annular flat section 1012 has an outer surface 1011 that is flat (i.e., straight or linear) in the longitudinal direction. In other words, the outer surface 1011 of the annular flat section 1012 is approximately parallel to the longitudinal axis 1001.

The second end portion 1004 has a similar structure to the first end portion 1002. The second end portion 1004 comprises a hemi-spherical section 1016 at the second end 1005 of the sealing member 1000, an angled section 1018 that connects to the stem portion 1006, and an annular flat section 1020 therebetween. The annular flat section 1020 has a flat outer surface 1021.

In some embodiments, the first end portion 1002 further comprises a first recess 1014 in its hemi-spherical section 1008 and the second end portion 1004 comprises a second recess 1022 in its hemi-spherical section 1016. In FIGS. 10A, the first and second recesses 1014, 1022 are shown in dashed lines as they would not normally be visible in a side view of the sealing member 1000. The first recess 1014 is at the first end 1003 of the sealing member 1000 and the second recess 1022 is at the second end 1005. The first and second recesses 1014, 1022 in this example are approximately frustoconical in shape and coaxial with the longitudinal axis 1001. In other embodiments, the recesses 1014, 1022 may be any other suitable shape.

The first and second recesses 1014, 1022 and the annular flat sections 1012, 1020 may be useful in the manufacture of the sealing member 1000. When the sealing member 1000 is formed, the hemi-spherical sections 1008 and 1016 may be machined (e.g., grinded) to precisely match the geometry of a corresponding valve seat of a valve assembly. The first and second recesses 1014, 1022 may be used to receive an appropriate tool or instrument to hold the sealing member 1000 during machining. The annular flat sections 1012, 1020 may allow the sealing member 1000 to be held securely to assist with the machining process.

The precise geometry of the machined hemi-spherical sections 1008 and 1016 allows the sealing member 1000 to form a tight seal with the valve seat, which is typically made of a hard, inflexible material. The tight seal is particularly important in valve assemblies deployed in deviated wells since gravitational forces do not assist in holding the sealing member engaged with the valve seat as in conventional ball check valves in vertical wells.

The positioning of the first and second recesses 1014, 1022 and the annular flat sections 1012, 1020 is such that they may facilitate the machining of the hemi-spherical sections 1008 and 1016, while not interfering with the seal between the hemi-spherical sections 1008 and 1016 and the valve seat when the sealing member 1000 is deployed in a valve assembly.

The stem portion 1006 may be approximately cylindrical in shape. The stem portion 1006 may have a smaller outer diameter and cross-sectional area than the first and second end portions 1002 and 1006. Compared to the sealing members 200 and 300, the stem portion 1006 of the sealing member 1000 has a slightly greater outer diameter. The angled sections 1010 and 1018 of the first and second end portions 1002 and 1006 may provide a gentle transition from the annular flat portions 1012 and 1020 to the stem portion 1006.

Other variations are also possible. It will be understood that sealing members may be provided comprising any combination of features from the sealing members 200, 300, and 1000 as described above.

FIGS. 11A and 11B are side, partial cross-sectional views of a standing valve assembly 1100 including the sealing member 1000 of FIGS. 10A-10C. FIG. 11A shows the sealing member 1000 in a closed position and FIG. 11B shows the sealing member 1000 in an open position. In this example, the first end portion 1002 of the sealing member 1000 is the sealing end and engages the valve seat 1106 when the sealing member 1000 is in the closed position.

The valve assembly 1100 comprises a flow cage 1101, a valve seat 1106, and the elongated sealing member 1000. The valve assembly 1100 is connected to a seat bushing 1104 at its downhole end. The flow cage 1101 and the seat bushing 1104 are shown as transparent for illustrative purposes to allow the valve seat 1106 and sealing member 1000 to be viewed.

The flow cage 1101 is similar in structure to the flow cage 401 of the valve assembly 400 as described above. The valve seat 1106 is generally annular in shape (i.e., ring-shaped) and defines a central channel 1108 therethrough.

Figure 12A:
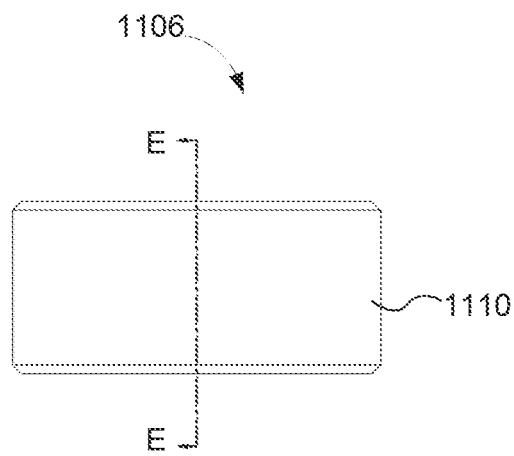
FIG. 12A is a side view of a valve seat of the standing valve assembly of FIGS. 11A and 11B.
Figure 12B:
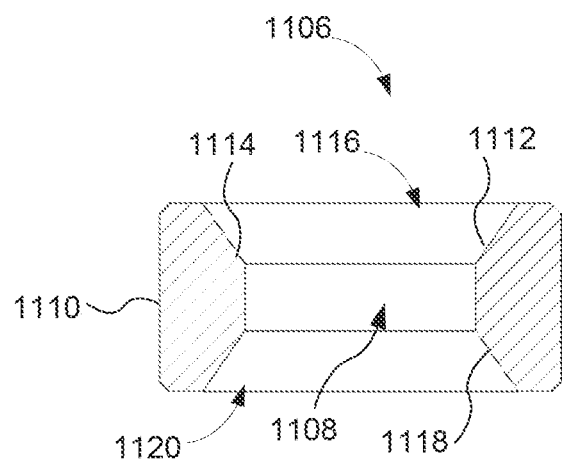
FIG. 12B is a cross-sectional view of the valve seat taken along line E-E in FIG. 12A.
Figure 12C:
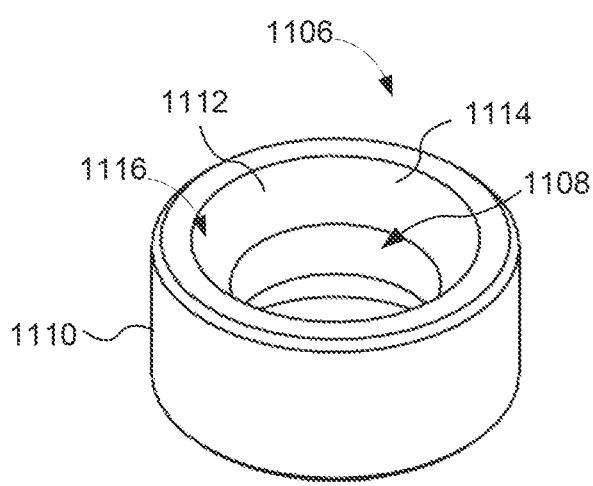
FIG. 12C is a perspective view of the valve seat of FIG. 12A.

The valve seat 1106 will be discussed in more detail with reference to FIGS. 12A, 12B, and 12C. Referring to FIG. 12B, the valve seat 1106 comprises an outer wall 1110 and an inner wall 1112. The outer wall 1110 is approximately cylindrical in shape to allow the valve seat 1106 to fit securely within the flow cage 101. The inner wall 1112 defines the central channel 1108 extending through the valve seat 1106. The inner wall 1112 comprises an upper portion 1114 defining an upper opening 1116 to the central channel 1108 and a lower portion 1118 defining a lower opening 1120. In this embodiment, the upper portion 1114 of the inner wall 1112 is angled with respect to the axial direction such that the upper opening 1116 is approximately frustoconical in shape. Optionally, the lower portion 1118 of the inner wall 1112 is also angled such that the lower opening 1120 is also approximately frustoconical in shape.

Referring again to FIGS. 11A and 11B, the valve seat 1106 is positioned within the flow cage 1101 such that the upper opening 1116 faces towards the sealing member 1000. When the sealing member 1000 is in the closed position, the hemi-spherical section 1008 of the first end portion 1002 is received into the upper opening 1116 and abuts the upper portion 1114 of the inner wall 1112. The angle of the upper portion 1114 of the inner wall 1112 is selected to be complementary to the curve of the hemi-spherical section 1008 such that the sealing member 1000 forms a tight seal with the valve seat 1106.

In this embodiment, as both the upper and lower openings 1116 and 1120 of the valve seat 1106 are frustoconical in shape, the valve seat 1106 is reversible such that either end can engage the sealing member 1000. In other embodiments, only the upper opening 1116 may be frustoconical and the lower opening 1120 may be cylindrical or any other suitable shape.

In other embodiments, the sealing member 1000 may be used in any other suitable valve assembly, including the standing and travelling valve assemblies 400, 500, 600 and 700 described above. It will be understood that the sealing members 200, 300, and 1000 can be used in any of the valve assemblies described herein and in any other suitable valve assembly comprising a suitable flow cage and valve seat.

Figure 13:
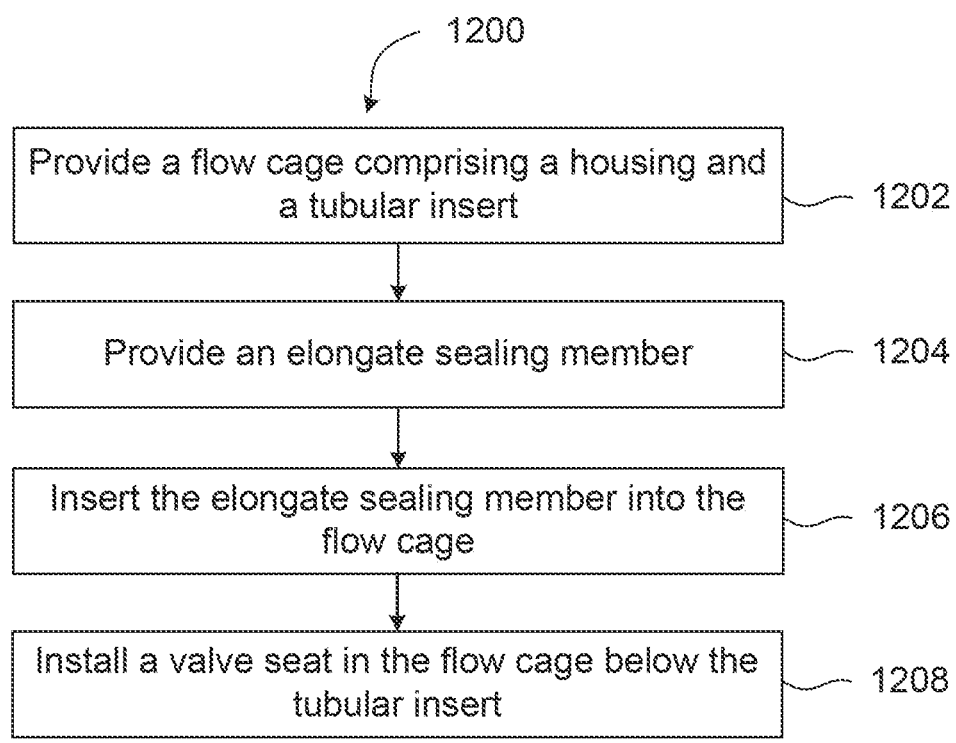
FIG. 13 is a flowchart of an example method for assembling a valve assembly, according to some embodiments.

FIG. 13 is a flowchart of a method 1200 for assembling a valve assembly, according to some embodiments. The valve assembly may be a standing valve assembly or a travelling valve assembly of a reciprocating pump.

At block 1202, a flow cage is provided, the flow cage comprising a housing and a tubular insert received within the housing. As used herein, "providing" in this context refers to making, assembling, buying, acquiring, or otherwise obtaining one of the components described herein. In some embodiments, the flow cage is provided using the methods described in U.S. patent application Ser. No. 17/218,839, filed Mar. 21, 2021, the entire content of which is herein incorporated by reference. The flow cage may have any of the features of the flow cages described above, including the flow cage 401 of FIGS. 4A-4D.

In some embodiments, the housing and insert are provided separately and assembled to provide the flow cage. In other embodiments, the housing and insert may be provided as a unitary structure. In some embodiments, the insert comprises a first (upper) insert section and a second (lower) insert section and the upper and lower insert sections may be assembled in the housing to form the flow cage. In some embodiments, the upper and lower insert sections are assembled such that a plurality of side openings in the upper insert section align with a plurality of side openings in the lower insert section.

At block 1204, an elongated sealing member is provided. The elongated sealing member may have a first end portion, a second end portion, and a stem portion therebetween. The sealing member may have any of the features of the sealing members 200, 300, and 1000 described above. In some embodiments, providing the sealing member comprises integrally forming the first and second end portions and stem. In other embodiments, providing the sealing member comprises coupling the first and second end portions to the stem.

In some embodiments, providing the sealing member comprises machining the sealing end for a precise fit with a corresponding valve seat. In some embodiments, the machining step includes holding a flat annular section of the elongated sealing member while machining a hemi-spherical end section. In some embodiments, grooves may be machined into the non-sealing end (i.e., the end opposite the sealing end).

At block 1206, the elongated sealing member is inserted into the flow cage such that the elongated sealing member is at least partially received within the tubular insert. In some embodiments, the sealing member is symmetrical and can be inserted in either axial orientation. In other embodiments, where the first end portion has a different structure or material than the second end portion, the sealing member may be inserted with the sealing end facing in the downhole direction.

At block 1208, a valve seat is installed in the flow cage below the tubular insert. The valve seat may be secured in the flow cage by an interference fit, threading, or may be held in place by a seat bushing, seat plug, or any other suitable component.

Embodiments of the sealing members, valve assemblies, and methods herein may provide standing valves and/or travelling valves for downhole reciprocating pumps with improved performance in deviated wells. However, it will be understood that the sealing members, valve assemblies and methods could also be used in other applications and embodiments are not limited to only use in reciprocating pumps in deviated wells.

Although particular embodiments have been shown and described, it will be appreciated by those skilled in the art that various changes and modifications might be made without departing from the scope of the disclosure. The terms and expressions used in the preceding specification have been used herein as terms of description and not of limitation, and there is no intention in the use of such terms and expressions of excluding equivalents of the features shown and described or portions thereof. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A valve assembly for a reciprocating downhole pump comprising:
a flow cage comprising:
a housing having a longitudinal axis and defining an axial bore therethrough; and
a tubular insert received within the axial bore, the tubular insert defining an axial flow passage, wherein the tubular insert comprises:
an upper insert section comprising an upper plurality of helical side ribs defining an upper plurality of helical side openings to the axial flow passage, the upper insert section further comprising an upper stop; and
a lower insert section comprising a lower plurality of helical side ribs defining a lower plurality of helical side openings to the axial flow passage, the lower insert section being positioned below the upper insert section, and wherein the lower insert section lacks a stop;
an annular valve seat received within the axial bore and positioned below the tubular insert; and
an elongated sealing member positioned above the annular valve seat and at least partially received within the axial flow passage of the tubular insert, wherein the elongated sealing member is movable between a closed position, in which the elongated sealing member engages the annular valve seat, and an open position, in which the elongated sealing member is displaced from the annular valve seat.

2. The valve assembly of claim 1, wherein the elongated sealing member comprises a first end portion that engages the annular valve seat and a stem portion extending from the first end portion.

3. The valve assembly of claim 2, wherein the elongated sealing member further comprises a second end portion, and wherein the stem portion interconnects the first end portion and the second end portion.

4. The valve assembly of claim 3, wherein the second end portion defines one or more grooves on an outer surface thereof.

5. The valve assembly of claim 3, wherein the second end portion is made of a different material than at least one of the first end portion and the stem portion.

6. The valve assembly of claim 2, wherein the first end portion has a hemi-spherical section that engages the annular valve seat and an annular flat section adjacent to the hemi-spherical section.

7. The valve assembly of claim 6, wherein the first end portion further comprises a recess in the hemi-spherical section, the recess approximately coaxial with the longitudinal axis.

8. The valve assembly of claim 2, wherein the first end portion is approximately spherical in shape.

9. The valve assembly of claim 2, wherein the first end portion is made of a different material than the stem portion.

10. The valve assembly of claim 1, wherein each upper helical side opening of the upper plurality of helical side openings is along the same helical path as a respective lower side helical opening of the lower plurality of helical side openings.

11. The valve assembly of claim 1, wherein the annular valve seat defines a frustoconical opening for the elongated sealing member.

12. The valve assembly of claim 1, wherein the valve assembly is a standing valve assembly or a travelling valve assembly.

13. A method for assembling a valve assembly, according to some embodiments, the method comprising:
providing a flow cage, the flow cage comprising a housing and a tubular insert received within the housing, wherein the tubular insert defines an axial flow passage and comprises:

an upper insert section comprising an upper plurality of helical side ribs defining an upper plurality of helical side openings to the axial flow passage, the upper insert section further comprising an upper stop; and a lower insert section comprising a lower plurality of helical side ribs defining a lower plurality of helical side openings to the axial flow passage, the lower insert section being positioned below the upper insert section, and wherein the lower insert section lacks a stop;

providing an elongated sealing member;

inserting the elongated sealing member into the flow cage such that the elongated sealing member is at least partially received into the tubular insert; and installing a valve seat in the flow cage below the tubular insert.

14. The method of claim 13, wherein providing the flow cage further comprises providing a first insert section and a second insert section and assembling the first and second insert sections within the housing.

\* \* \* \* \*